Dec. 16, 1941. R. VASARD Re. 21,981

PERCUSSION TOOL

Original Filed June 27, 1939

Inventor,
Richard Vasard
By: Glascock Downing & Seebold
Attys.

Reissued Dec. 16, 1941

Re. 21,981

UNITED STATES PATENT OFFICE 21,981

PERCUSSION TOOL

Richard Vasard, New York, N. Y., assignor to Hans G. Schwallbach, New York, N. Y.

Original No. 2,211,993, dated August 20, 1940, Serial No. 281,498, June 27, 1939. Application for reissue October 23, 1941, Serial No. 416,282

8 Claims. (Cl. 125—33)

My invention relates to percussion or hammering tools in which a drill head is subjected to blows produced by an impact element and has particular reference to tools in which the impact element is under action of centrifugal force.

I am aware that percussion tools based on the action of centrifugal force have been used before, but in such tools the full benefit of the power acquired by the hammer or percussion element has not been utilized. Theoretical calculations prove that a free percussion element, moving in suitable guides from central portions of a rotor toward its periphery, because of the continuous acceleration by the centrifugal force, acquires a velocity twice as great as the velocity of the corresponding peripheral portions of the rotor. This fact has not been considered in the previous constructions, the guiding groove or channel for the percussion element terminating at a point where it just reached the peripheral portion of the rotor, so that the movement of the percussion element has been stopped by the outer end wall of the groove before the element could come in contact with the anvil block through which the blows are transmitted to the shank of a tool, such as drill, chisel, digger, etc. As a result, the percussion element, striking the end wall with considerable force, not only harmfully jarred the structure, but also lost considerable portion of its energy, dissipated in the shock when the element was compelled suddenly to reduce its speed to that of the peripheral portion of the rotor where the groove ends, i. e., to almost one-half of its acquired speed.

The object of my invention is to provide a percussion tool or device in which the free percussion element is at first accelerated by the centrifugal force in a channel, extending spirally from the inner portion of the rotor to its periphery, where the spiral groove or channel gradually merges into a relatively long channel, extending substantially concentrically with the axis of rotation. The percussion element, while moving in the concentric or arcuate channel, maintains its acquired velocity, striking the end of an anvil block placed in its path, prior to reaching the outer end of the channel, with the speed twice as great as the peripheral speed of the rotor at the radius of the outer channel. As a result, all the acquired energy of the percussion element or hammer is converted into the useful work of driving the operating tool. Since this energy is due to the velocity twice as great as the peripheral velocity of the hammer, and the energy is proportional to the square of the velocity, it follows that with my device there will be substantially four times as much energy delivered to the operating tool than with ordinary devices of this type in which the guiding channel terminates just when it reaches the peripheral portion of the rotor, so that the velocity of the percussion element is limited to the velocity of the restraining outer end of the channel.

I have found by actual experiments that in practice it is easy to maintain conditions under which the percussion element always strikes the end of the anvil before reaching the outer end of the groove.

Another object of my invention is to provide an arrangement whereby two percussion elements are made to operate successively in the same rotor, two channels being provided for this purpose.

Still another object of my invention is to provide a relatively long inner spiral channel or groove, this object being accomplished by placing the inner end of the groove at a point opposite the outer end, i. e., with the center of rotation approximately between the inner and outer ends of the groove.

My invention is more fully described in the accompanying specification and drawing in which—

Figure 2:
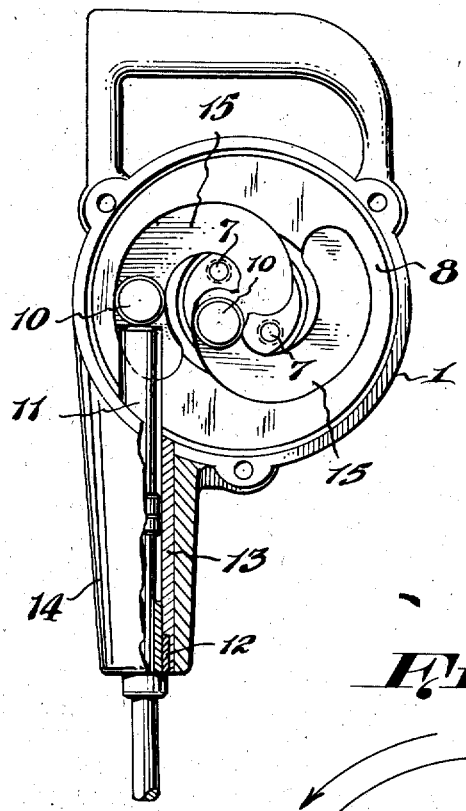
Fig. 2 is a transverse sectional view of the same.
Figure 1:
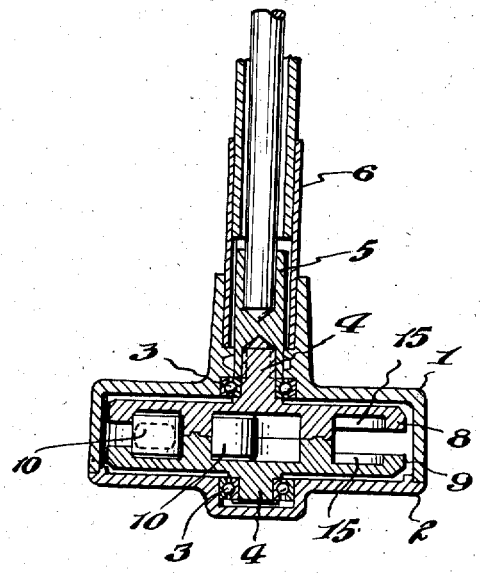
Fig. 1 is a sectional elevational view of my tool.

The tool consists of a casing 1 with a suitable handle and a cover 2. The casing and the cover are provided with recesses for ball bearings 3, supporting trunnions 4 extending from discs 8 and 9. The trunnion 4 of the disc 8 is connected to a flexible shaft 5 rotatively supported in a bushing 6 fitted in a central extension of the casing 1. The discs are provided with spiral guiding grooves 15 opposite each other, extending outward from points S in the central portion of the rotor toward the peripheral portion where the spiral grooves merge into arcuate grooves V, Fig. 3, substantially concentric to the axis of rotation and extending through a relatively large portion of a circle K near the periphery of the discs. In order to obtain a smooth transition of the radial curve to the peripheral concentric groove so as to reduce friction to a minimum, the starting inner portion of the groove is placed at the other side of the center H, the latter being thus located between the two ends of each groove. The grooves represent guiding channels for cylindrical impact elements 10, the latter being free to slide in the grooves toward their periphery by the action of centrifugal force. The casing has an extension 14 at the periphery with a bore for a plunger or anvil block 11, which transmits blows of the hammer or impact element 10 to the shank of an operating tool, such as drill, chisel, digger, etc., supported in an adjustable bushing 13. The anvil block 11 is placed with its axis tangentially to the circle K so that the hammers 10 can strike the end of the anvil block when the discs are rotating.

As it was mentioned, the anvil block rests on the shank of the operating tool, and they both freely slide in the bushing 13. It is possible, therefore, to change the position of the anvil block in the bore of the extension 14 by raising or lowering the housing when the tool rests on an object being drilled. By thus changing the position of the anvil block, it is possible to vary the force of the blows delivered by the hammers. It is also possible to raise the housing into an idling position in which the hammers no longer strike the anvil but remain in the outer ends of the grooves while the rotor is rotating, the rotation in such a case being very quiet, without any vibrations, since there will be no moving parts inside the rotor.

I have proved by actual experiments that the operating cycle of the device is one blow by each of the hammers during each revolution of the rotor. Any variations in the speed of rotation of the rotor do not cause any changes in the operating cycle.

Figure 3:
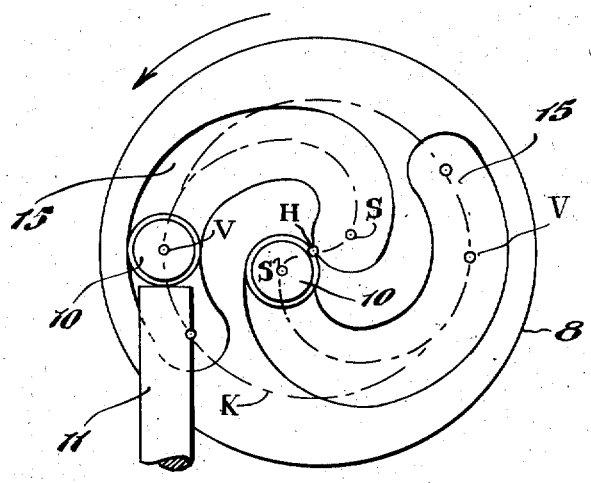
Fig. 3 is an enlarged view of a rotating disc with the impact element.

As shown in Fig. 3, the inner ends of the grooves almost merge into each other, due to the elimination of a shaft in the inner portion of the rotor. With my design it is possible, therefore, to provide two channels in one rotor with two percussion elements, thereby doubling the rapidity of the blows.

I claim:

1. A percussion tool comprising a casing having a centrally positioned extension at the side, a shaft journaled in the extension adapted to be connected to a source of power, a plate in the casing attached to the inner end of the shaft, a second plate in the casing in a spaced parallel relation to the first plate, the plates having at their inner sides curved bottomed grooves opposite each other extending from the outer portions of the plates substantially to the axis of their rotation, cylindrical members slidably supported at their ends in the grooves, means to support the second plate on the first plate, said means extending between intermediate portions of the plates outside the grooves, a tubular tangential extension on the casing and a plunger slidably supported in the tangential extension, the cylindrical members being adapted to successively strike the inner end of the plunger when the shaft is rotated, the tangential extension being adapted to removably support a drilling tool in an operative contact with the plunger.

2. A percussion tool comprising a casing having a centrally positioned extension at the side, a shaft journaled in the extension adapted to be connected to a source of power, a plate in the casing attached to the inner end of the shaft, a second plate in the casing in a spaced parallel relation to the first plate, the plates having at their inner sides arc-like grooves opposite each other and extending from the peripheral portions of the plates substantially to their centers, straight cylindrical members slidably supported in the grooves and abutting by their ends the bottoms of the grooves, bolts attaching the second plate to the first plate and passing through the plates at points at the sides of the grooves, a tubular tangential extension on the casing and a plunger slidably supported in the tangential extension, the cylindrical members being adapted to successively strike the inner end of the plunger when the shaft is rotated, the tangential extension being adapted to removably support a drilling tool in an operative contact with the plunger.

3. A percussion tool comprising a casing having a centrally positioned extension at the side, a shaft journaled in the extension adapted to be connected to a source of power, a plate in the casing attached to the inner end of the shaft, a second plate in the casing in a spaced parallel relation to the first plate, the plates having at their inner sides curved bottomed grooves opposite each other extending from the outer portions of the plates substantially to the axis of their rotation, cylindrical members slidably supported at their ends in the grooves, means to support the second plate on the first plate, said means extending between intermediate portions of the discs outside the grooves, a tubular tangential extension on the casing, a plunger slidably supported in the tangential extension, the cylindrical members being adapted to successively strike the inner end of the plunger when the shaft is rotated, the tangential extension being adapted to removably support a drilling tool in an operative contact with the plunger, and means to adjust the position of the tool and plunger in the tangential extension for regulating the force of blows of the cylindrical members against the plunger.

4. A percussion tool comprising a support, a rotary member in the support having a guide extending spirally outward from the inner portion of the rotary member and extending further substantially concentrically to the axis of rotation, a hammer slidably engaging the guide, an anvil block slidably mounted in the support to be struck by the hammer, and means to rotate the rotary member.

5. A percussion tool comprising a support, a rotary member in the support having a guide extending spirally outward from the inner portion of the rotary member and extending further substantially concentrically to the axis of rotation, the concentric portion of the guide extending through a relatively large portion of the rotary member, a hammer slidably engaging the guide, an anvil block slidably mounted in the support to be struck by the hammer, means to support an operating tool in contact with the anvil block, and means to rotate the rotary member.

6. A percussion tool comprising a support, a rotary member in the support having a guide extending spirally outward from the inner portion of the rotary member and extending further substantially concentrically to the axis of rotation, the concentric portion of the guide extending through a relatively large portion of the rotary member, the center of the rotary member being positioned approximately between the ends of the guide, a hammer slidably engaging the guide, an anvil block slidably mounted in the support to be struck by the hammer, means to support an operating tool in contact with the anvil block, and means to rotate the rotary member.

7. A percussion tool comprising a casing, a rotary member in the casing having a channel extending spirally from the inner portion of the rotary member to its outer portion and extending further approximately concentrically to the axis of rotation for a relatively large distance and having further an open annular slot, a hammer slidably engaging the channel, a tubular extension on the casing, an anvil block slidably supported in the extension, the inner end of the anvil block entering the annular peripheral slot in the rotary member, the extension being adapted to support a tool in contact with the anvil block, means to rotatively support the rotary member in the casing, and means to rotate the rotary member, thereby causing the hammer to strike the anvil block, the length of the concentric channel being sufficient to enable the hammer to strike the anvil block prior to reaching the end of the channel.

8. A percussion tool comprising a support, a rotary member in the support having a guide extending spirally outward from the inner portion of the rotary member and extending further substantially concentrically to the axis of rotation, a hammer slidably engaging the guide, an anvil block slidably mounted in the support to be struck by the hammer, and means to rotate the rotary member, the length of the concentric channel being sufficient to enable the hammer to strike the anvil block prior to reaching the end of the channel.

RICHARD VASARD.